United States Patent [19]

Gazalski

[11] Patent Number: 5,231,780
[45] Date of Patent: Aug. 3, 1993

[54] ANIMATED GAME BIRD DECOY

[76] Inventor: Richard S. Gazalski, 1001 Grandview, Henryetta, Okla. 74437

[21] Appl. No.: 939,714

[22] Filed: Sep. 2, 1992

[51] Int. Cl.$^5$ ............................................ A01M 31/06
[52] U.S. Cl. ............................................................ 43/3
[58] Field of Search ....................................... 43/2, 3

[56] References Cited

U.S. PATENT DOCUMENTS

| | | | |
|---|---|---|---|
| 74,458 | 2/1868 | Wales | 43/3 |
| 378,410 | 2/1888 | Trimble | 43/3 |
| 547,553 | 10/1895 | Keller | 43/3 |
| 1,831,286 | 11/1931 | Chelini | 43/3 |
| 2,413,418 | 12/1946 | Rulison | 43/3 |
| 2,691,233 | 10/1954 | Richardson | 43/3 |
| 4,128,958 | 12/1978 | Snow | 43/3 |

FOREIGN PATENT DOCUMENTS

| | | | |
|---|---|---|---|
| 264313 | 4/1929 | Italy | 43/2 |

*Primary Examiner*—Kurt C. Rowan
*Attorney, Agent, or Firm*—Shoemaker & Mattare Ltd.

[57] ABSTRACT

A plastic shelled game bird decoy is converted to an animated decoy by providing rod-like wing supports rotatably mounted to the interior of the plastic shell and attached together to an operation cord, wire, rope, or the like in a manner that can rotationally move the supports away from the exterior of the shell body. Flexible wing members resembling the wings of the decoy specie are attached to each of the rod-like wing supports so that movement of the rods will simultaneously move both of the wings in a realistic flapping or flagging movement. The wings can be in separate pieces or preferably a single piece attached to the rods and to the back of the decoy shell. In combination with the operation cord, a neck cord is attached to the operation cord and to a cylindrical, rotatable neck mounting member so that lateral movement of the operation cord away from the decoy will simultaneously move both the wings and rotate the neck mounting member so that the head and neck of the bird decoy will turn while the wings are flagging or flapping.

1 Claim, 3 Drawing Sheets

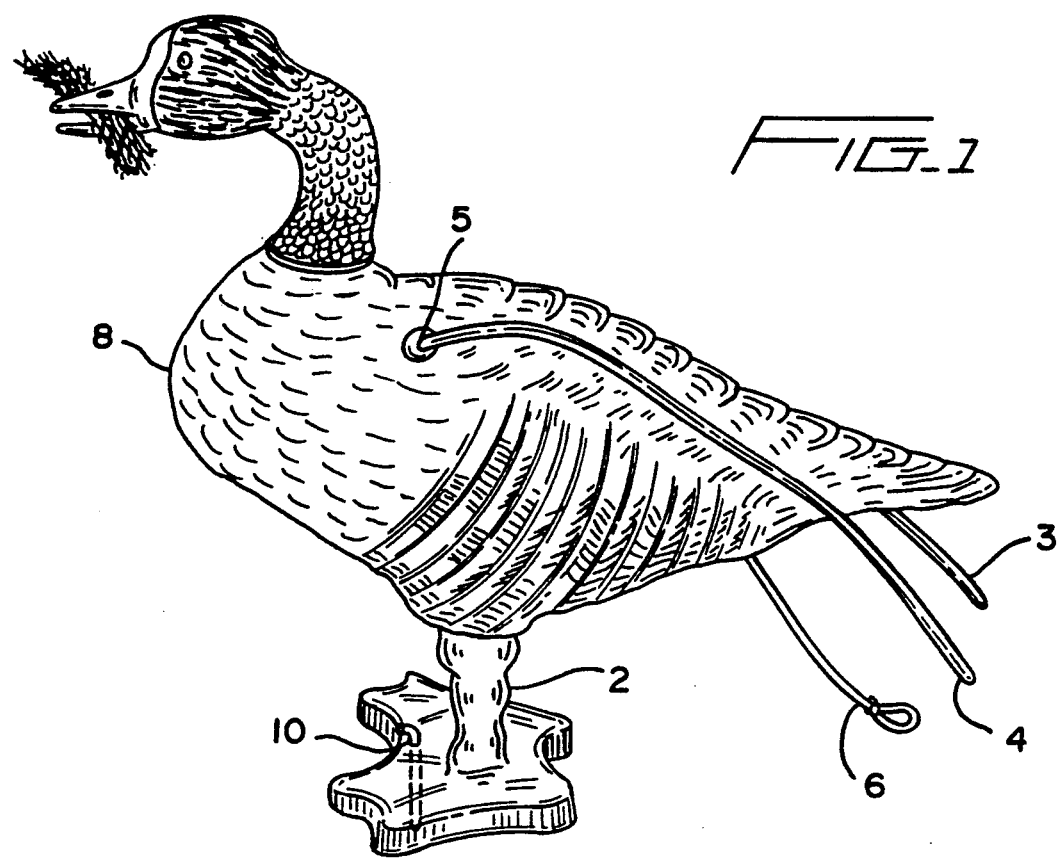
FIG_1
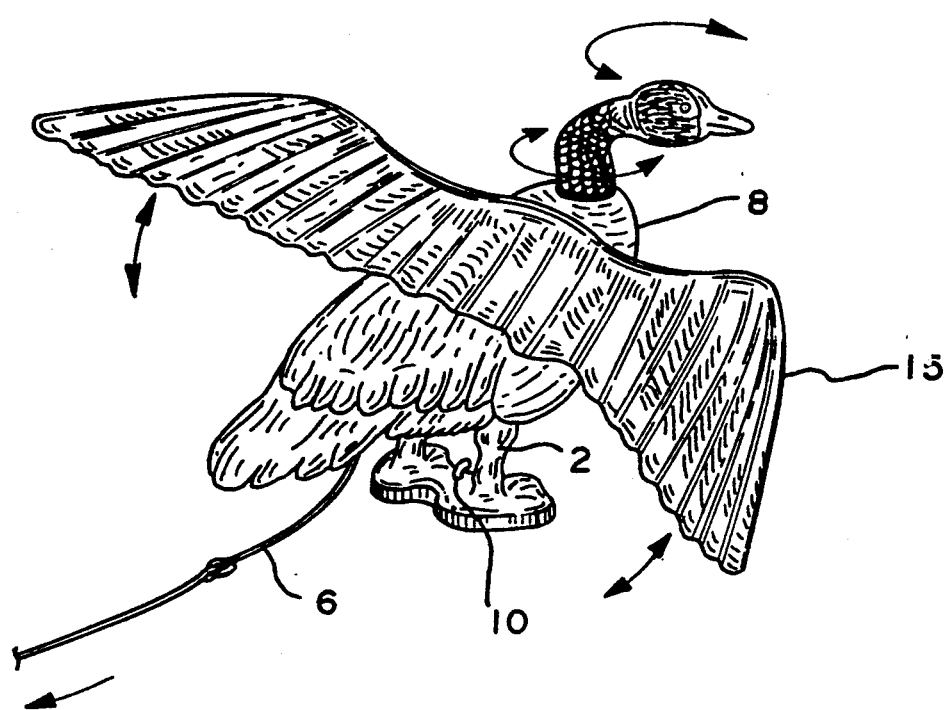
FIG_2

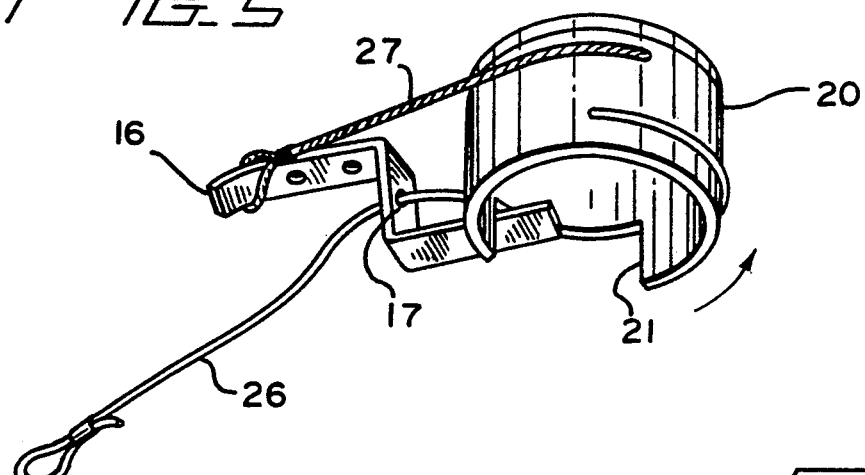
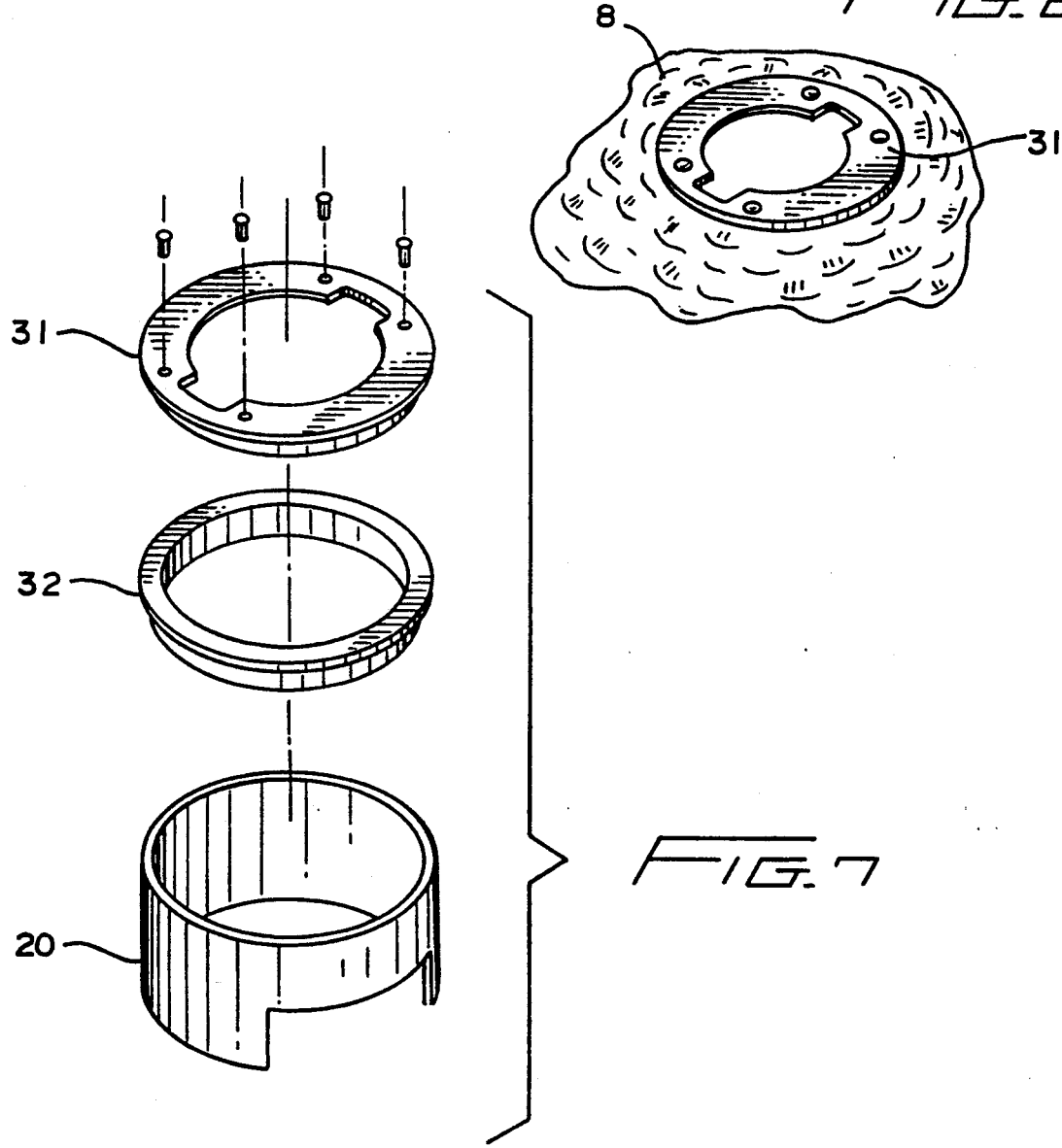

ANIMATED GAME BIRD DECOY

BACKGROUND OF THE INVENTION

1. Field of the Invention

The present invention relates to animated bird decoys and more particularly to water fowl decoys that simulate the typical head and neck movement and wing movement of feeding birds.

2. Description of the Prior Art

Animated game bird decoys have been designed to realistically replicate various movements of feeding birds in an attempt to provide a spread of decoys with added realism to live birds. Examples of such designs are described in the patents issued to Larry L. Jackson, U.S. Pat. Nos. 4,896,448 and 5,036,614. Respectively, they describe means for moving the wings of a sitting or standing decoy and for imparting a tilling movement to simulate a feeding bird. A major drawback to some of the proposed designs for providing animation is the need to incorporate self-contained and powered mechanisms that impart an unnatural mechanical aspect to the decoys as the movements are repeated at regular intervals. Likewise, as is true for any self-contained mechanical mechanism, they can be subject to failure at inopportune times due to wear and exposure to weather. This is particularly troublesome with goose decoys that receive rough usage under preferably inclement weather conditions. Further, self-powered mechanical devices, while not necessarily complex, are nonetheless relatively expensive for decoy use. Game bird decoys are used in large numbers and must be sold relatively inexpensively in quantity for the average waterfowl hunters to be able to justify their cost.

It is, therefore, an object of the present invention to provide an inexpensive game bird decoy that can be animated by the hunter in a realistic manner to simulate the movements of live birds which are feeding.

Likewise, it is an object of the present invention to provide a simple mechanical mechanism for providing wing and head and neck movement which is powered by the hunter and not susceptible of mechanical failure under the conditions of its use.

It is a further object of the present invention to provide a mechanism which can be employed to easily convert a commercial decoy to the animated game bird decoy of the present invention.

SUMMARY OF THE INVENTION

A plastic shelled game bird decoy is converted to an animated decoy by providing rod-like wing supports rotatably mounted to the interior of the plastic shell and attached together to an operation cord, wire, rope, or the like in a manner that can rotationally move the supports away from the exterior of the shell body. Flexible wing members resembling the wings of the decoy specie are attached to each of the rod-like wing supports so that movement of the rods will simultaneously move both of the wings in a realistic flapping or flagging movement. The wings can be in separate pieces or preferably a single piece attached to the rods and to the back of the decoy shell. In combination with the operation cord, a neck cord is attached to the operation cord and to a cylindrical, rotatable neck mounting member so that lateral movement of the operation cord away from the decoy will simultaneously move both the wings and rotate the neck mounting member so that the head and neck of the bird decoy will turn while the wings are flagging or flapping.

BRIEF DESCRIPTION OF THE DRAWINGS

FIG. 1 is a side perspective of a standing goose decoy of the present invention without the external wings;

FIG. 2 is a perspective of the decoy of FIG. 1 with a single piece pair of wings in place;

FIG. 5 is a rigid bottom view of the neck mounting assembly of FIG. 4;

FIG. 6 is a top view of the neck mounting assembly in place on the shell of FIG. 1; and FIG. 7 is an exploded view of the neck mounting assembly before mounting to the shell as shown in FIG. 7.

DETAILED DESCRIPTION OF THE PREFERRED EMBODIMENTS

Figure 3:
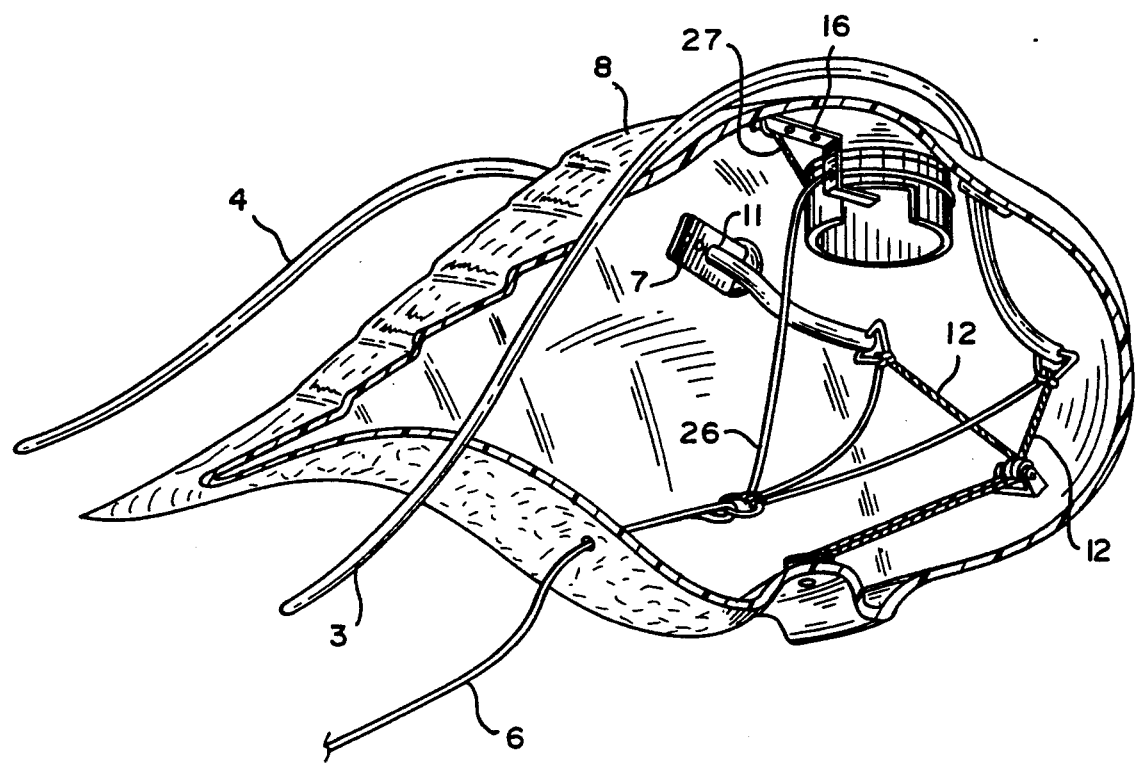
FIG. 3 is a partial breakaway view of the shell of the decoy body of FIG. 1 illustrating the internal animation mechanism.

Referring to FIG. 1, a typical standing goose decoy is illustrated such as can be purchased from G&H Decoy Inc. of Henryetta, Okla. The decoy can have a hollow molded foot assembly 2 which can be filled with sand or lead shot or other material to provide weight and stability. A shell decoy of this type is described in U.S. Pat. No. 4,885,861 issued to R. S. Gazalski, the description of which is incorporated herein in its entirety by reference. The head and neck assembly shown with a split beak is optionally provided for added realism. Hole 5 is shown with through which rod-like wing support member 4 is inserted. Another hole (not shown) receives support member 3. Operation cord 6 is shown below the full body for attachment to a longer cord for operation by the hunter. Anchor spike 10 is shown for added stability, if necessary to prevent lateral operation of the cord 6 from pulling the decoy over during operation of the animation mechanisms. As shown in FIG. 2, the head and neck can swivel and the flexible wings 15, shown there in their extended position, can be extended or rest on the body of the decoy to simulate folded wings.

Referring to FIG. 3, the wing support rods 3 and 4 are preferably made of thermoplastic polyolefin rod material, either polyethylene or polypropylene and are preformed, typically by heating, into the shapes shown in FIG. 3 so that the flexible wings (FIG. 2) can be attached by any suitable means, not shown, to provide the appearance of wings at rest. The rods 3 and 4 are received through holes in the full shell body. A pivot bracket 7 is shown riveted to the plastic body 8 of the decoy. The generally rectangular bracket 7 is provided with a hole 11 sized to snugly receive the rod 4. The rod 4 then preferably extends forward a preselected distance inside of the body 8 where it is attached by suitable means to the operation cord and a resilient means 12, preferably a bungee cord. The resilient means 12 extending from the rod 4 and the rod 3 are then anchored, as shown, to provide a biasing of the rods 3 and 4 into the wings at rest position shown in FIG. 3. The lateral movement of the operation cord in the direction shown by the arrow will rotate the rods 3 and 4 from the at rest position (not shown). Relaxation of the lateral force on the operation cord will permit the bungee biasing means 12 to urge the rods 3 and 4 back to the wings at rest position shown. As will be more fully described hereinafter, this flapping movement provided by the hunter using intermittent lateral pulling force on operation cord 6, flaps the wings 15 while simultaneously rotating the head and neck of the decoy in an extraordinary realistic manner.

Figure 4:
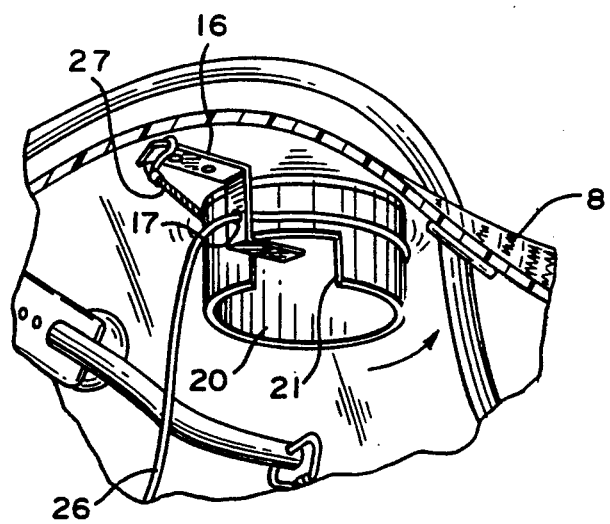
FIG. 4 is an enlarged view of the shell of FIG. 3 showing the cylindrical neck mounting means attached to the shell.

Referring to FIG. 4, a stop bracket 16 is fastened to the body 8 in the position shown, by any suitable means such as rivets, the angle shown on the stop bracket is located to intersect an open slot 21 on cylindrical neck support 20. The stop bracket 16 then prevents the neck support from dropping down lower into the interior of the body 8 than the depth of the slot and permits rotation of the neck support for the distance provided by the width of the slot. An operating cord 26 is attached to the neck support 20 and is threaded through a hole 17 in stop bracket 16, as shown. The mounting location of the cord 26 to the neck support 20 is preferably more than at least half of the way around the cylindrical neck support, typically as shown in FIG. 5. A resilient member 27 is also provided as shown, anchored in any suitable manner to the stop bracket 16 and to the neck support 20, preferably adjacent to the mounting of the cord 26. Lateral force provided by a force pulling on cord 26 in the direction of the arrow will cause rotation of the neck support 20 in the direction shown by the arrow until the stop bracket 20 engages or contacts the right hand side of the slot 21. Relaxation of the pulling force on cord 26 will permit the resilient member 27 to urge rotation of the neck support 20 in the direction shown by the arrow in FIG. 5 until the stop bracket engages or contacts the left hand edge of the slot 21. In this manner, the neck and head can be rotated a limited amount and smoothly and controllably return to the original position. The operator can almost noiselessly control the movement so that the animation can appear normal and non-mechanical.

FIG. 7 illustrates the mounting bracket which locates the neck of the decoy and the neck support 20 so that the decoy neck is snugly retained in frictional engagement with the neck support for the operation described. The bracket is comprised of a top flange 31 located on the top surface of body 8 and slotted to receive a typical decoy neck and provided with peripheral holes for receiving fastening members, and a bottom flange 32 which is anchored by the fastening members described to the inside of the body 8. The neck support 20 is received in sliding engagement with the lip shown depending from flange 32.

With the apparatus described, the full-bodied decoy shown is provided or converted into an animated decoy which will produce the desired flagging movement created by flapping wings simultaneously with a realistic head and neck movement associated with live birds which are on the ground feeding. Several of these animated decoys can be placed in a decoy spread and simultaneously or separately activated by a common operating line or by separate lines. The color and length of the lines can be selected to fit the terrain, blind location, or the like, within wide limits.

The invention has been described in its preferred embodiment and it should be appreciated that different material compositions and sizes as well as attachment locations can be provided to accomplish the same realistic functional result. The scope of the invention is therefore only to be limited to that of the claims, interpreted in light of the pertinent prior art.

I claim:

1. A game bird decoy comprising a body shell with separate head and neck received in said body wherein:
   a) elongated wing support members are rotatably received in said body shell and have attached thereto flexible wing-shaped member,
   said elongated wing support members terminating inside said body and attached at their terminus to cord members and elongated resilient return members respectively, said resilient return members being anchored to said shell body and said cord members being commonly attached to an operating cord which extends outside of the shell body, whereby lateral movement of said operating cord by pulling the cord away from the shell body will rotate the wing support members upward and away from said shell body and relaxation of the cord member will permit said elongated resilient return members to urge the wing support members downward and toward the shell body, and
   b) cylindrical neck mounting means provided for mounting the head and neck of the decoy frictionally and rotatably in the shell body said neck mounting means including elongate resilient return means and operating cord means located on the outer periphery of the cylindrical neck mounting means, said operating cord means being attached to the common juncture of the cord members attached to the terminus of the wing support members so that movement of the wing support members will simultaneously produce limited rotational movement of the neck mounting means and thereby the neck and head of the decoy.

* * * * *